United States Patent [19]

Schmidt

[11] Patent Number: 4,900,296
[45] Date of Patent: Feb. 13, 1990

[54] ARTICULATED BELT FOR CONTINUOUSLY VARIABLE CONICAL PULLEY, BELT-DRIVE TRANSMISSION

[75] Inventor: Vinzenz Schmidt, Pulheim, Fed. Rep. of Germany

[73] Assignee: Ford Motor Company, Dearborn, Mich.

[21] Appl. No.: 290,059

[22] Filed: Dec. 27, 1988

[30] Foreign Application Priority Data

Feb. 19, 1988 [DE] Fed. Rep. of Germany ....... 3805182

[51] Int. Cl.$^4$ .............................................. F16G 1/22
[52] U.S. Cl. .................................................. 474/242
[58] Field of Search ..................... 474/206, 210–212, 474/224, 226, 227, 232, 201, 237, 242–245; 59/84, 85, 88

[56] References Cited

U.S. PATENT DOCUMENTS 4,473,365  9/1984  Lapeyre ........................ 474/242 X
4,729,757  3/1988  Cataldo ............................. 474/242

FOREIGN PATENT DOCUMENTS 0014492   6/1982  European Pat. Off. .
1137609  10/1962  Fed. Rep. of Germany .

Primary Examiner—Thuy M. Bui
Attorney, Agent, or Firm—Frank G. McKenzie; Donald J. Harrington

[57] ABSTRACT

The drive belt for a continually variable, cone-pulley drive belt transmission includes links connected to form a continuous circulating belt able to articulate in one or both directions about the longitudinal axis of the belt. Each link includes at least one trapezoidal planar surface, a roller-shaped rib located at the central plane of the link, at least one planar surface inclined with respect to the trapezoidal surface, and a roller-shaped channel having a cross section complimentary to the cross section of the rib. The links are maintained engaged by fitting projection located at the forward edge of the link in a complimentary recess located on the rear face of each link.

8 Claims, 5 Drawing Sheets

ARTICULATED BELT FOR CONTINUOUSLY VARIABLE CONICAL PULLEY, BELT-DRIVE TRANSMISSION

BACKGROUND OF THE INVENTION

1. Field of the Invention

This invention relates to a belt that drivably engages conical pulleys located on parallel shafts for producing stepless variable gear ratios.

2. Description of the Prior Art

German patent No. 1 137 609 describes a drive belt for a continually variable belt drive transmission in which links are mutually connected forming an articulating chain and a continuous circulating drive belt. This belt has the disadvantage that it requires two different forms of link members, a radially outer link, a radially inner link, joined in a hooked manner with the outer link and elements that prevent disassembly. To prevent the inner and outer link members from disengaging in the radial direction, a pin is inserted through the outer surface of the radially outer link, extends through the thickness of the belt, and is fixed to a disc located at the inner surface of the inner member. Accordingly, a belt formed of links made in this way is complicated to manufacture and assemble, and its cost is high.

European patent No. 0 014 492 describes a drive belt that includes profiled plate-like links located with respect to one another by recesses and mating projections, and at least two flexible metal bands located in recesses formed in the plate links. The bands are carriers that hold the plate members together to form a belt.

This belt has the disadvantage that, in order to join the plate members together to form a continuous circulating belt, highly flexible steel bands are required. These banks are difficult to produce and must be inserted into the plate links either from both sides or from the top and one side. Manufacture of these flexible steel bands is complicated and expensive.

SUMMARY OF THE INVENTION

An object of this invention is to provide an articulated drive belt for a continually variable transmission that requires substantially lower production and assembly, cost, uses only one form of identical link members, and requires no additional elements for holding the links of the belt in the assembled position.

The articulated drive belt according to this invention is formed from an assembly of identical link members without additional means to join and retain the links. Each link includes a trapezoidal plate element having a planar surface on one face and a roller-shaped rib lying on the longitudinal axis of the assembled belt. On the opposite face of the trapezoidal plate member from the planar surface is a planar upper surface parallel to the planar surface and a lower surface inclined with respect to the planar surface on the front face. On the rear face of the link, a roller-shaped channel, complimentary to the rib and adapted to receive the rib within the channel, is located on the longitudinal axis of the assembled belt. Each link is formed with a recess on its upper edge of the rear face of the link and a projection on the upper edge on the front face of the link. The form of the recesses and projections is complimentary to facilitate nesting projections within recesses. The belt is formed by transversely sliding a rib along the channel of an adjacent link. This assembly process is repeated until a continuous, endless belt is formed of links joined in this way. The links can be articulated transversely to the pulling direction of the assembled belt up to the curvature limit permitted by the inclined surfaces on the lower rearward face of the links. When the belt is extended in a pulling or tension direction, the cooperating recesses and projections prevent the links from becoming disassembled due to transverse movement relative to the pulling direction.

When the belt is articulated, the projections become disengaged with the recess when curvature of the belt is large. Therefore, there is no provision to prevent transverse movement of the link when curvature of the belt is extreme. During transport, some means must be provided to prevent disassembly. In operation, when articulation of the belt is large, the belt is located between conical pulleys, which engage lateral faces of the belt and absolutely prevent transverse movement of the links so that disassembly of the links is prevented.

In operation where the belt travels away from the pulleys, its length is nearly linear. In this condition the recesses and projections engage and prevent lateral movement of the links relative to the longitudinal axis of the belt.

One form of the links of the belt permit articulation in both directions about the longitudinal axis.

BRIEF DESCRIPTION OF THE DRAWINGS

The invention is explained in greater detail with reference to embodiments illustrated in the accompanying drawings.

DESCRIPTION OF THE PREFERRED EMBODIMENTS

Figure 1A:
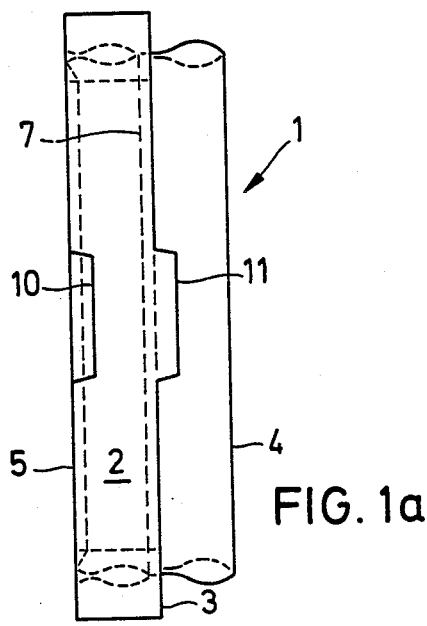
FIGS. 1a, 1b and 1c are a plan view, side view and front view of an element of an articulated belt according to the invention.
Figure 1B:
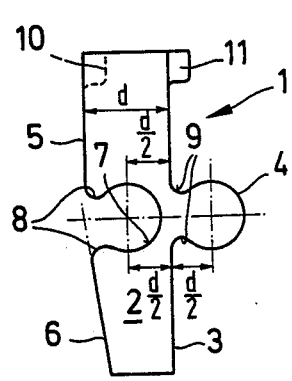
Figure 1C:
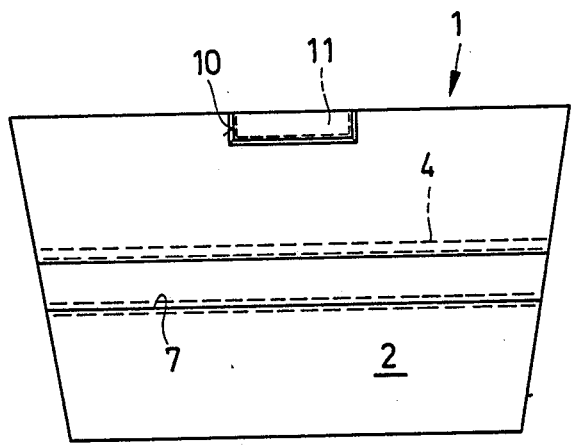
Figure 2:
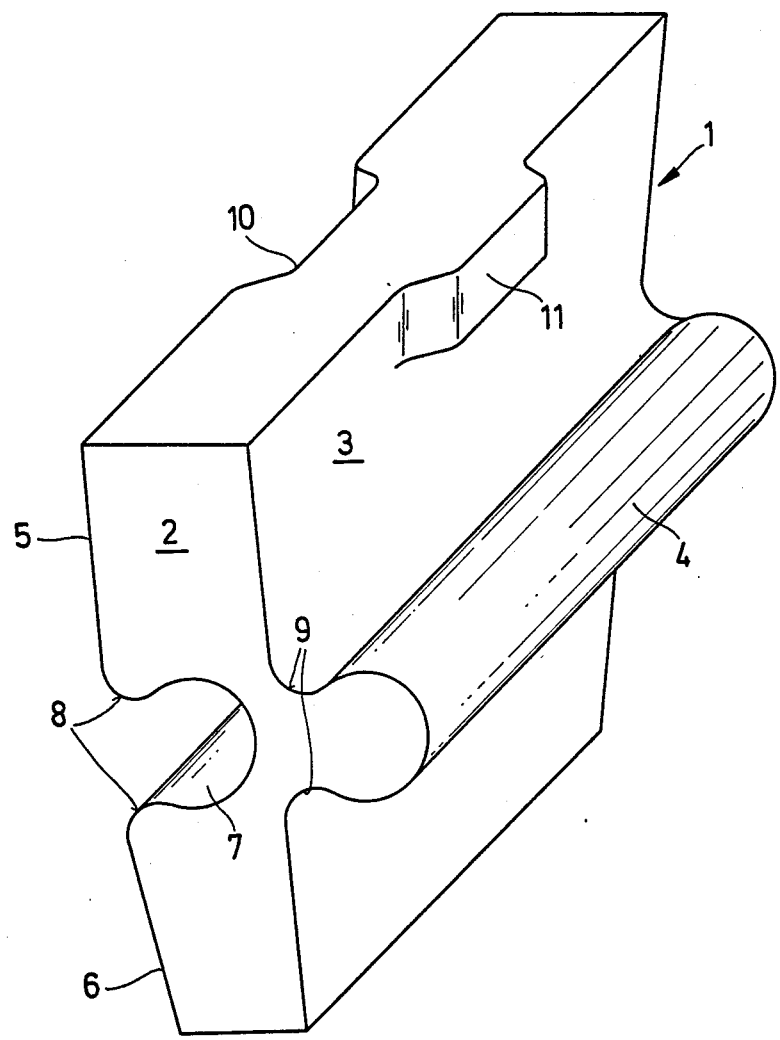
FIG. 2 is an isometric view from the side and front of an element of the drive belt.

Referring first to FIGS. 1 and 2, a link of an articulated belt 1 includes a trapezoidal portion 2 and a rib 4 located on the longitudinal axis of the belt. Surfaces 3 and 5 are planar and mutually parallel, but planar surface 6 is inclined with respect to surfaces 3 and 5. Each element of the belt includes a roller-shaped channel 7 centered on the longitudinal axis of the assembled belt and located approximately in the medial plane of each link and parallel to the rib.

The transition areas from the plane surfaces 5 and 6 to the roller-shaped channel include round fillets 8; and the transition areas between the plane surface 3 and the roller-shaped web 4 include rounded fillets 9 complimentary to fillets 8.

the axis of the roller-shaped channels ideally lies midway between surfaces 3 and 5 and the axis of the projecting roller-shaped rib 4 is located beyond surface 3 by half the thickness d.

A rectangular recess 10, located on the upper edge of each link midway between the lateral side, extends along a portion of the width of each link. A rectangular projection 11, formed on the upper edge of surface 3, extends toward the face of the preceding link and is aligned with recess 10. When a belt assembled by linking the elements extends lengthwise, the recess 10 and projection 11 prevent adjacent links contacting one another, except for contact of ribs 4 on the inner surface of channel 7. The links are assembled and disassembled by sliding ribs 4 laterally across the width of channels 7.

Figure 5:
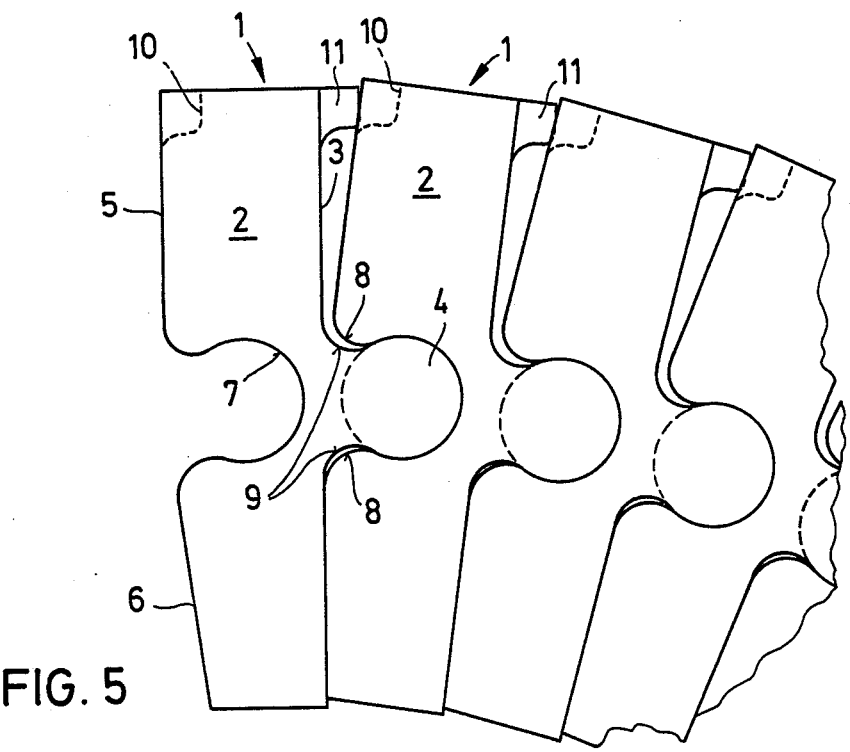
FIG. 5 is a side view showing a number of connected elements forming a curved portion of the drive belt of FIGS. 1 and 2.
Figure 6:
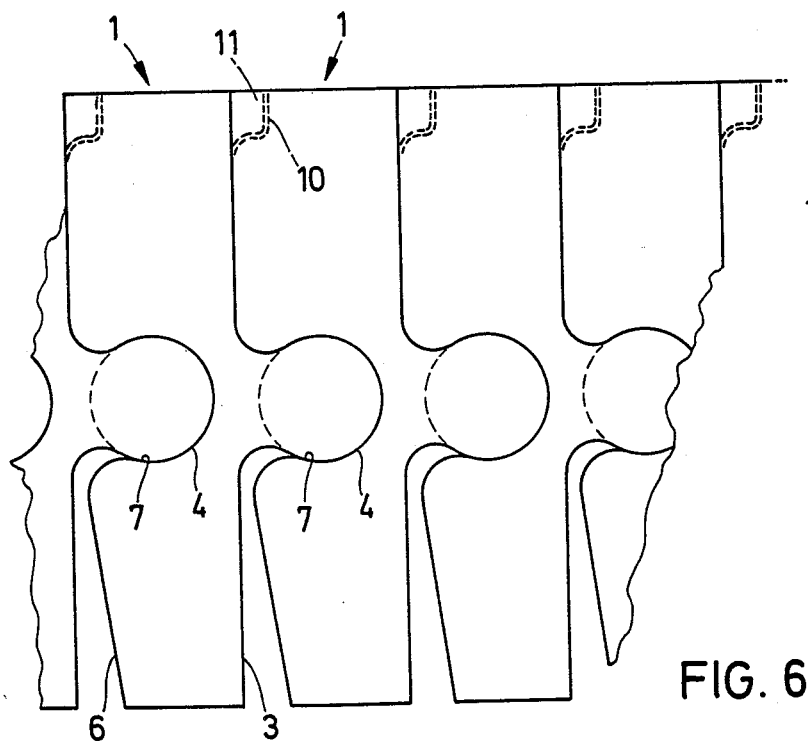
FIG. 6 shows a side view of a number of elements of the drive belt of FIGS. 1 and 2 with tensile load applied and the belt extending linearly.

Considering now FIGS. 2, 5 and 6, the cooperating roller surfaces of channels 7 and ribs 4, inclined surfaces 6, the depth of recesses 10, and the height of projections 11 are selected so that two adjacent links are fitted laterally along the roller-member connection when their plane surface 3 abuts the lower inclined surface 6 of the adjacent link. When the articulated link belt is extended longitudinally, as in FIG. 6, recesses 10 and projections 11 lock the belt to prevent the links from sliding laterally relative to one another.

The elements or links of a belt according to this invention can be produced by sinter pressing, fine stamping, or profile rolling with subsequent fine stamping in an inexpensive and dimensionally accurate procedure that involves only formation of identical links, but no additional components needed to form an assembly of the links.

Figure 3A:
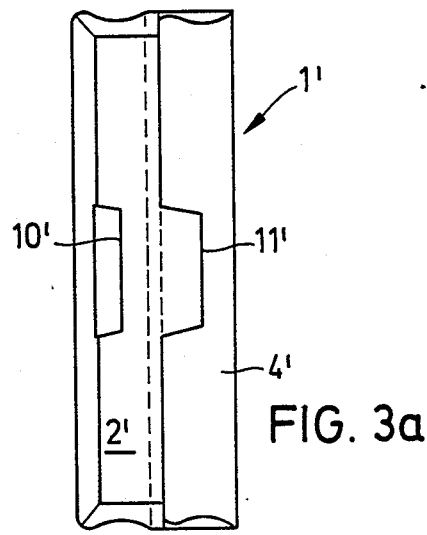
FIGS. 3a, 3b an 3c are a plan view, side view and front view of a second embodiment of an element of a drive belt according to this invention.
Figure 3B:
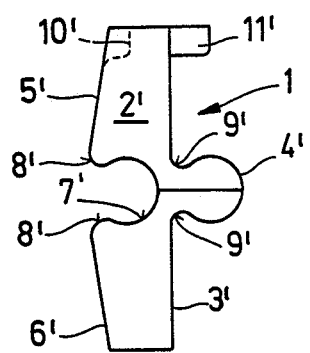
Figure 3C:
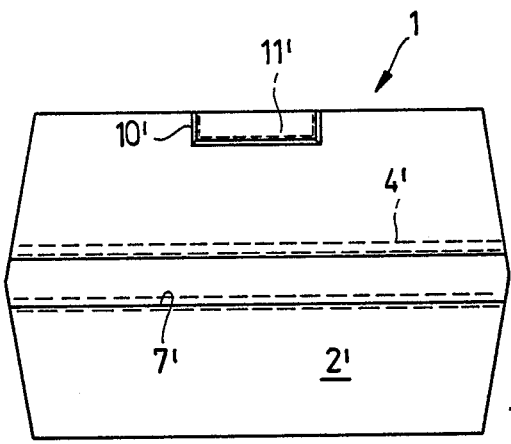
Figure 4:
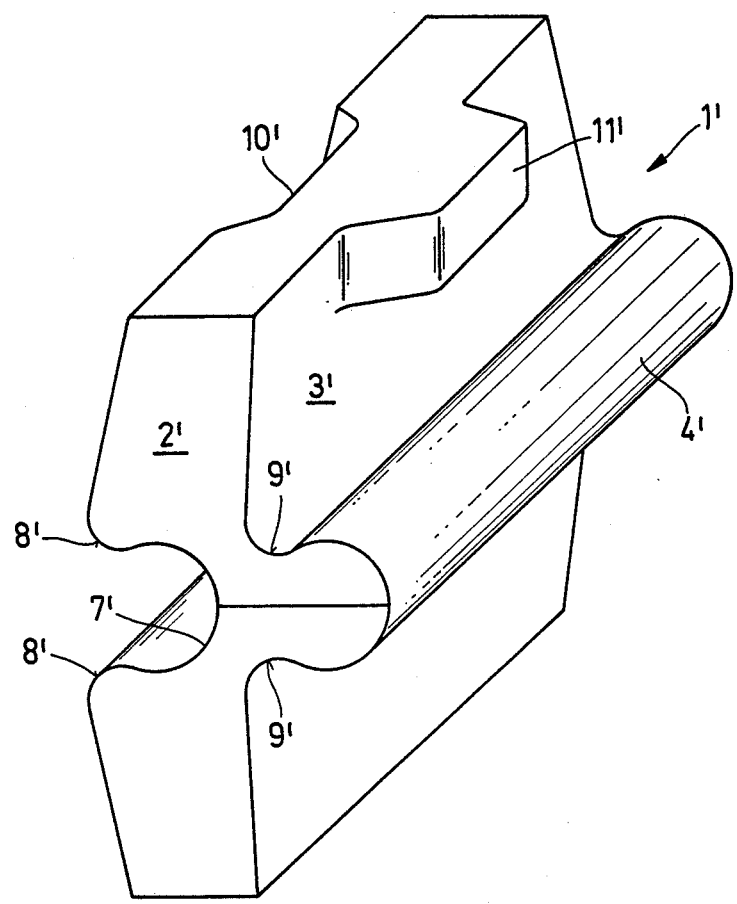
FIG. 4 is an isometric view from the side and front of an element of the drive belt of FIG. 3.

FIGS. 3 and 4 illustrate a link of the continually variable transmission that can articulate in both directions with respect to the longitudinal axis of the belt. In FIGS. 3 and 4 the same reference numerals have been used as in FIGS. 1 and 2 to refer to similar components except that the numerals are provided with a prime in each case.

The upper planar surface 5' is inclined with respect to planar surface 3' as is surface 6'. The recess 10' and projection 11' are sized to permit articulation in both directions and the projections nest within recesses on the adjacent link to prevent disengagement of the links by sliding laterally, which movement would otherwise permit rib 4' becoming disengaged from channel 7'.

The shapes of the roller-shaped channels 7' and roller-shaped webs 4' may be different from a circular shape, provided that the necessary articulating operation is maintained. Also, the recesses and projections are located not only on the central axis but, where appropriate, near the lateral extremities of the links.

Having described preferred embodiments of my invention, what I claim and desire to secure by U.S. Letters Patent is:

1. A link of a longitudinally continuous drive chain, comprising:
    means for mutually connecting consecutive links along a longitudinal axis and permitting articulation among the links about a transverse axis perpendicular to and intersecting the longitudinal axis;
    a first substantially planar surface facing longitudinally and in the direction the belt moves when transmitting power; and
    second and third surfaces facing longitudinally and opposite the direction the first surface faces, the second and third surfaces being inclined with respect to the first surface and offset laterally on opposite sides of the longitudinal axis from the location of the connecting means; and
    means for preventing displacement of the link along the transverse axis relative to the other links of the chain.

2. The link of claim 1 wherein the means for preventing displacement of the link along the transverse axis relative to other links of the chain includes:
    a projection defining laterally spaced abutting surfaces, the projection being located on the first surface and extending outward therefrom; and
    a recess located on an opposite longitudinal face of the link from the location of the projection, adapted to receive a projection therein, and defining laterally spaced stopping surfaces adapted to contact the abutting surfaces of the projection.

3. A drive chain for transmitting power between pulleys, the chain comprising identical links arranged consecutively and connected to longitudinally leading and trailing adjacent links to form an endless chain, each link including:
    means for mutually connecting consecutive links along a longitudinal axis and permitting articulation among the links about a transverse axis perpendicular to and intersecting the longitudinal axis;
    a first substantially planar surface facing longitudinally and in the direction the belt moves when transmitting power;
    second and third surfaces facing longitudinally and opposite the direction the first surface faces, the second and third surfaces being inclined with respect to the first surface and offset laterally on opposite side of the longitudinal axis from the location of the connecting means; and
    means for preventing displacement of the link along the transverse axis relative to the other links of the chain.

4. The link of claim 3 wherein the means for preventing displacement of the link along the transverse axis relative to other links of the chain includes:
    a projection defining laterally spaced abutting surfaces, the projection being located on the first surface and extending outward therefrom; and
    a recess located on an opposite longitudinal face of the link from the location of the projection, adapted to receive a projection therein, and defining laterally spaced stopping surfaces adapted to contact the abutting surfaces of the projection.

5. A link of a longitudinally continuous, articulating drive chain, comprising:
    a cylindrical rib located on a longitudinal axis along which links of the drive chain are connected mutually, extending laterally across the width of the link, and extending along the longitudinally axis outward from a surface of the link;
    a cylindrical channel located on the longitudinal axis, adapted to receive and retain a rib therein, whereby successive links are connected mutually;
    a first substantially planar, longitudinally facing surface from which the rib extends transversely;
    a second substantially planar surface, facing longitudinally opposite the direction the first surface faces, extending transversely from the cylindrical channel in a first direction; and
    a third substantially planar surface, facing longitudinally opposite the direction the first surface faces, extending transversely from the cylindrical channel in a second direction inclined with respect to the second surface.

6. The link of claim 5 further comprising:

a projection having laterally spaced abutting surfaces, the projection being located on the first surface and extending outward therefrom; and a recess located on a surface of the link facing longitudinally opposite the surface on which the projection is located, adapted to receive a projection therein, and defining laterally spaced stopping surfaces, each stopping surface being adapted to contact an abutting surface of the projection.

7. A link of a longitudinally continuous, articulating drive chain, comprising:

a cylindrical rib located on a longitudinal axis along which links of the drive chain are connected mutually, extending laterally across the width of the link, and extending along the longitudinally axis outward from a surface of the link;

a cylindrical channel located on the longitudinal axis, adapted to receive and retain a rib therein, whereby successive links are connected mutually;

a first substantially planar, longitudinally facing surface from which the rib extends transversely;

a second substantially planar surface, facing longitudinally opposite the direction the first surface faces, extending transversely from the cylindrical channel in a first direction inclined with respect to the first surface; and a third substantially planar surface, facing longitudinally opposite the direction the first surface faces, extending transversely from the cylindrical channel in a second direction inclined with respect to the second surface and with respect to the first surface.

8. The link of claim 7 further comprising:

a projection having laterally spaced abutting surfaces, the projection being located on the first surface and extending outward therefrom; and a recess located on a surface of the link facing longitudinally opposite the surface on which the projection is located, adapted to receive a projection therein, and defining laterally spaced stopping surfaces, each stopping surface being adapted to contact an abutting surface of the projection.

* * * * *